United States Patent
Cook et al.

(10) Patent No.: US 7,496,693 B2
(45) Date of Patent: Feb. 24, 2009

(54) WIRELESS ENABLED SPEECH RECOGNITION (SR) PORTABLE DEVICE INCLUDING A PROGRAMMABLE USER TRAINED SR PROFILE FOR TRANSMISSION TO EXTERNAL SR ENABLED PC

(75) Inventors: Daniel B. Cook, Seattle, WA (US);
David Mowatt, Seattle, WA (US);
Oliver Scholz, Kirkland, WA (US);
Oscar E. Murillo, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/378,418

(22) Filed: Mar. 17, 2006

(65) Prior Publication Data
US 2007/0219802 A1    Sep. 20, 2007

(51) Int. Cl.
*H04B 1/38* (2006.01)
*G10L 21/00* (2006.01)
*H04M 1/00* (2006.01)
*H04H 7/00* (2006.01)

(52) U.S. Cl. .......... 710/10; 710/8; 710/9; 710/29; 704/243; 704/244; 704/245; 704/246; 704/1; 704/260; 704/270; 455/3.06; 455/41.2; 455/557; 455/563; 705/1; 705/26; 707/4; 707/9

(58) Field of Classification Search .......... 710/8–10, 710/29; 705/1, 26; 704/270, 1, 260, 243–246; 455/3.06, 41.2, 557, 563; 707/4, 9
See application file for complete search history.

(56) References Cited

U.S. PATENT DOCUMENTS

| | | | |
|---|---|---|---|
| 6,185,535 B1 * | 2/2001 | Hedin et al. | 704/270 |
| 6,396,935 B1 | 5/2002 | Makkonen | 381/334 |
| 6,598,021 B1 * | 7/2003 | Shambaugh et al. | 704/270 |
| 6,795,718 B2 | 9/2004 | Bae | 455/575.2 |
| 6,941,264 B2 * | 9/2005 | Konopka et al. | 704/243 |
| 7,143,041 B2 * | 11/2006 | Sacks et al. | 704/270 |
| 7,197,331 B2 * | 3/2007 | Anastasakos et al. | 455/557 |
| 7,302,391 B2 * | 11/2007 | Reding et al. | 704/246 |
| 7,359,671 B2 * | 4/2008 | Richenstein et al. | 455/3.06 |

(Continued)

FOREIGN PATENT DOCUMENTS

WO    WO 2005/064813    7/2005

OTHER PUBLICATIONS

"VXI B1000 GTX Bluetooth Wireless Headset and USB base Station," http://www.emicrophones.com/microphones/prod_details.asp?prodID=122, 2005 e Microphones, Inc., pp. 1-3.

(Continued)

*Primary Examiner*—Tammara Peyton
(74) *Attorney, Agent, or Firm*—Westman, Champlin & Kelly, P.A.

(57) ABSTRACT

A method of interacting with a speech recognition (SR)-enabled personal computer (PC) is provided in which a user SR profile is transferred from a wireless-enabled device to the SR-enabled PC. Interaction with SR applications, on the SR-enabled PC, is carried out by transmitting speech signals wirelessly to the SR-enabled PC. The transmitted speech signals are recognized with the help of the transferred user SR profile.

20 Claims, 9 Drawing Sheets

U.S. PATENT DOCUMENTS

| | | | |
|---|---|---|---|
| 7,376,648 B2* | 5/2008 | Johnson | 707/4 |
| 2002/0082057 A1 | 6/2002 | Kim | 455/568 |
| 2002/0111140 A1 | 8/2002 | Kim | 455/41 |
| 2003/0004724 A1* | 1/2003 | Kahn et al. | 704/260 |
| 2003/0207703 A1 | 11/2003 | Liou | 455/575.2 |
| 2004/0137967 A1 | 7/2004 | Bodley | 455/575.2 |
| 2004/0203351 A1 | 10/2004 | Shearer et al. | 455/41.1 |
| 2004/0203357 A1 | 10/2004 | Nassimi | 455/41.1 |
| 2004/0204168 A1 | 10/2004 | Laurila | 455/569.1 |
| 2004/0230489 A1* | 11/2004 | Goldthwaite et al. | 705/26 |
| 2004/0242278 A1* | 12/2004 | Tomoda et al. | 455/563 |
| 2005/0162508 A1 | 7/2005 | Basmadjian et al. | 348/14.01 |
| 2005/0179538 A1 | 8/2005 | Morita et al. | 340/539.1 |
| 2005/0209868 A1* | 9/2005 | Wan et al. | 705/1 |
| 2006/0270345 A1 | 11/2006 | DiGiovanna et al. | 455/41.2 |

OTHER PUBLICATIONS

"3010 Odyssey X," http://www.emicrophones.com/microphones/prod_details.asp?prodID=133, 2005 e Microphones, Inc., pp. 1-2.

"The benefits of Bluetooth," http://www.vnunet.com/computeractive/features/2014085/benefits-bluetooth, 1995-2006, vnu business Publ., part of vnu.net europe, pp. 1-5.

* cited by examiner

WIRELESS ENABLED SPEECH RECOGNITION (SR) PORTABLE DEVICE INCLUDING A PROGRAMMABLE USER TRAINED SR PROFILE FOR TRANSMISSION TO EXTERNAL SR ENABLED PC

CROSS REFERENCE TO RELATED APPLICATIONS

Reference is made to and commonly assigned U.S. patent application Ser. No. 11/378,550 filed Mar. 17, 2006 entitled "WIRELESS SPEECH RECOGNITION," the content of which is hereby incorporated by reference in its entirety.

BACKGROUND

While great progress has been made in the development of communication systems, only recently with the advent of Bluetooth and similar open specification technologies have developers been given the freedom to design, short range, wireless devices that can connect to a variety of different networks and systems while offering worldwide compatibility. One type of device resulting from the development of these technologies is a wireless headset that can connect to any similarly enabled device or system. When used with a cellular phone, for example, that is enabled/adapted for use with one of these technologies (for example, Bluetooth), the user of such a headset is able to talk freely, unencumbered by wires or cables, while taking advantage of the many benefits of the cellular phone. However, current wireless headsets provide very limited, if any, speech recognition functionality, although speech recognition is a natural interface for such wireless devices.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

The present embodiments relate to a method of interacting with a speech recognition (SR)-enabled personal computer (PC). In embodiments of the method, a programmable user SR profile is transferred from a wireless-enabled device to the SR-enabled PC. Interaction with an SR application, on the SR-enabled PC, is carried out by transmitting speech signals wirelessly to the SR-enabled PC. The transmitted speech signals are recognized with the help of the transferred programmable user SR profile.

BRIEF DESCRIPTION OF THE DRAWINGS

FIGS. 2-7 are block diagrams that illustrate examples of different portable wireless-enabled systems in accordance with the present embodiments.

DETAILED DESCRIPTION

The present embodiments deal with portable systems that enable users to wirelessly interact via voice with devices/environments that have speech recognition (SR) capabilities. However, before describing the present embodiments in greater detail, one illustrative environment with which the present embodiments can interact will be described.

Figure 1:
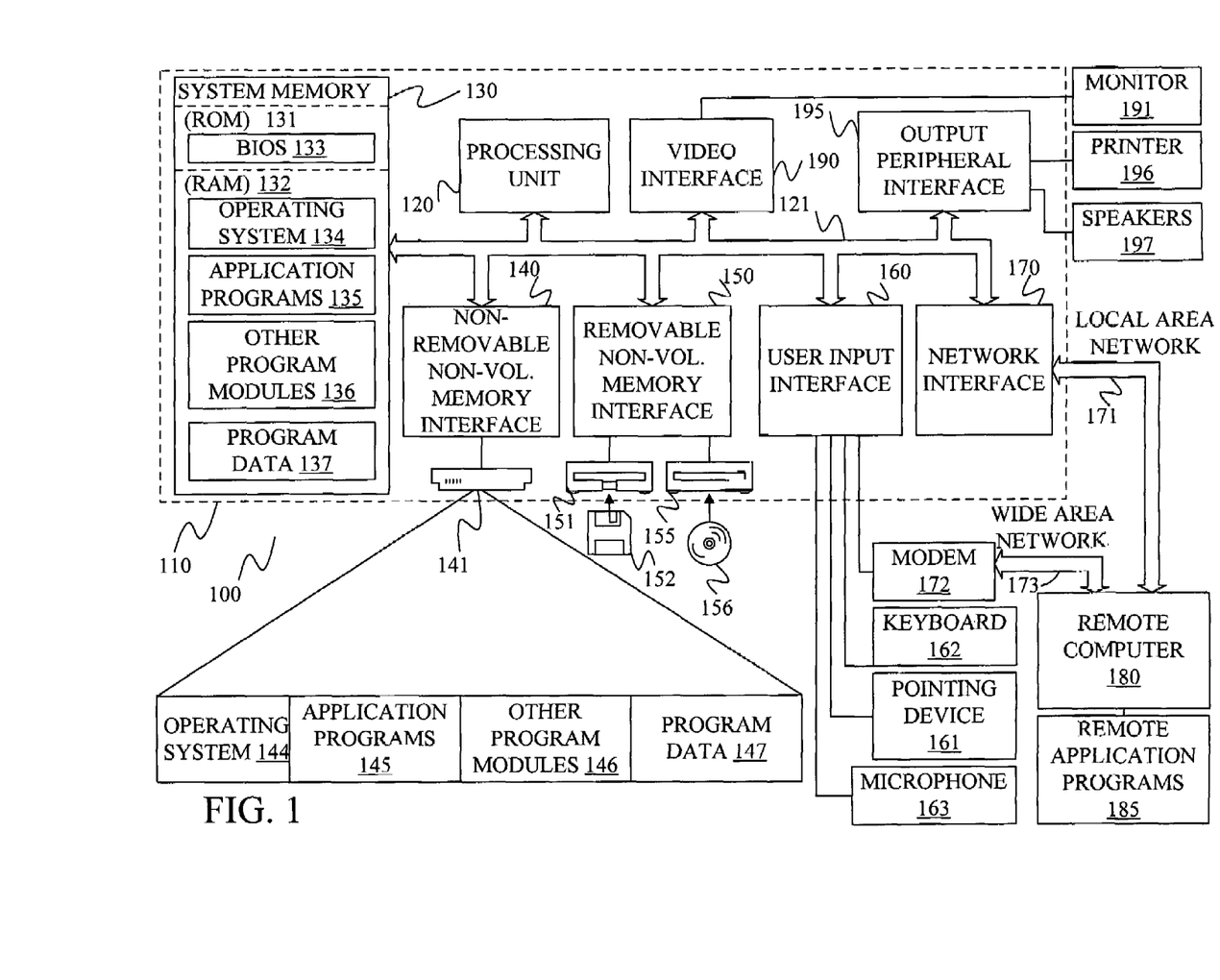
FIG. 1 is a block diagram of one illustrative computing environment with which the present embodiments can interact.

FIG. 1 illustrates an example of a suitable computing system environment 100 with which the present embodiments can interact. The same reference numerals are used in the various figures to represent the same or similar elements. The computing system environment 100 is only one example of a suitable computing environment and is not intended to suggest any limitation as to the scope of use or functionality of the present embodiments. Neither should the computing environment 100 be interpreted as having any dependency or requirement relating to any one or combination of components illustrated in the exemplary environment 100.

The present embodiments can interact with numerous other general purpose or special purpose computing system environments or configurations. Examples of well-known computing systems, environments, and/or configurations that may be suitable for interaction with the present embodiments include, but are not limited to, desktop personal computers (PCs), server computers, hand-held or laptop PCs, multiprocessor systems, microprocessor-based systems, set top boxes, programmable consumer electronics, network PCs, minicomputers, mainframe computers, telephony systems, distributed computing environments that include any of the above systems or devices, and the like.

With reference to FIG. 1, an exemplary system with which the present embodiments can interact includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. Application programs 135 and/or 145 include a speech recognition engine/system.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a desktop PC, a laptop PC, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that FIG. 1 illustrates only one computing environment with which the present embodiments can interact. In general, the present embodiments can interact with a number of different PCs such as laptop PCs, desktop PCs, mobile PCs, mobile phones, automotive PCs and media centers.

Figure 2:
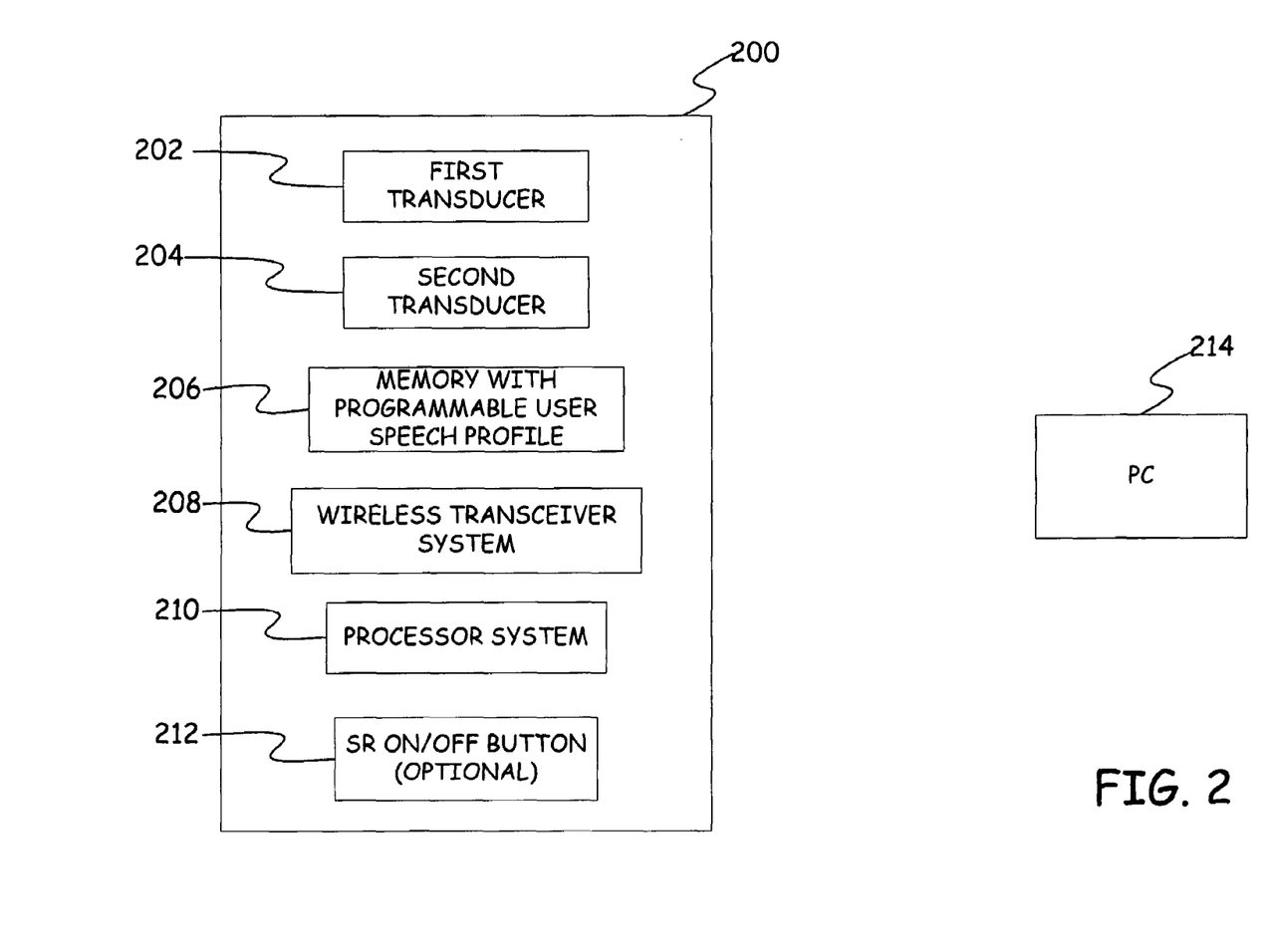

FIG. 2 is a simplified block diagram of an example portable wireless-enabled system 200, which can interact with a SR-enabled PC, in accordance with the present embodiments. As can be seen in FIG. 2, system 200 includes an input transducer (for example, a microphone) 202, an output transducer (for example, a speaker) 204, a memory 206, which includes a programmable user SR profile, a wireless transceiver system 208, a processor system 210 and a speech recognition (SR) on/off button 212. SR on/off button 212 is optional and, in general, any suitable technique for turning on/off power, or different functions, of system 200 can be used. Embodiments of system 200 are configured for low power consumption and can include, for example, rechargeable batteries with a relatively long use life. In some of the present embodiments, a case for system 200 can serve a charger for its rechargeable batteries. Selection of a particular type of power supply system (not shown) is also based on a desired size/form factor and other design aspects of system 200.

In some of the present embodiments, such as the embodiments shown in FIGS. 5, 6 and 7 that are described further below, the portable wireless-enabled system is a single wearable unit that is capable of communicating, via a wireless network (such as a Bluetooth wireless network or any other suitable wireless network currently known or developed in future), with a desktop computer, a laptop computer, a personal digital assistant, a cellular phone, or other device capable of communicating with the wireless network. In other embodiments, such as those shown in FIGS. 3-1, 3-2 and 4 which are discussed further below, components of the wireless-enabled system are divided into multiple groups (for example, two groups) to form multiple fundamental pieces. (for example, two fundamental pieces as shown in FIGS. 3-1, 3-2 and 4) that are able to communicate between each other wirelessly. In such embodiments, one of the fundamental pieces can be coupled non-wirelessly to a PC.

In general, a SR-enabled PC (such as 214), with which system 200 can communicate, can utilize the programmable user SR profile in memory 206 to provide relatively accurate recognition of speech signals that are wirelessly transmitted from system 200. Synchronization of the programmable user SR profile with the SR-enabled PC can be accomplished with the help of software that is capable of automatically carrying out the synchronization. This software can be included in memory 206 along with the programmable user speech profile. In some of the present embodiments, memory 206 is non-volatile and therefore its contents are not lost when system 200 is turned off. Details of more specific embodiments of system 200 are provided below in connection with FIGS. 3-7.

FIG. 3-1 and 3-2 are simplified block diagrams of an example portable wireless-enabled system 300, which is a more specific configuration of system 100. In general, system 300 includes, as its primary components, a headset 302 and a wireless adapter 304. Headset 302 is capable of wirelessly communicating with adapter 304 via wireless communication link 305 and therefore, when adapter 304 is attached to a non-wireless enabled PC (such as 306), speech signals can be transferred from headset 302 to PC 306 via adapter 304. It should be noted that, in system 300, wireless transceiver system 208 and processor system 210 (which are both also shown in FIG. 2) are each two-piece systems in FIG. 3.

Figure 31:
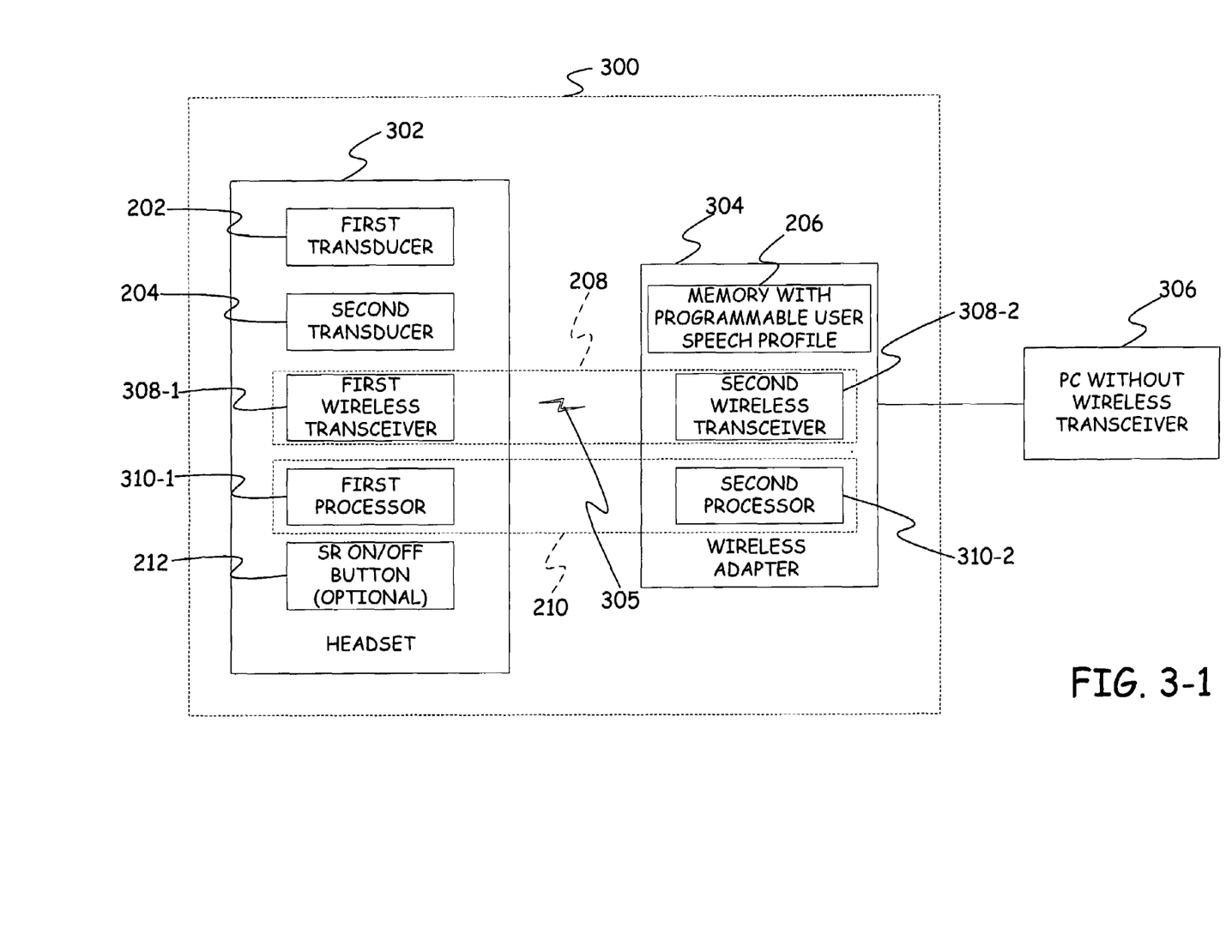

As can be seen in FIG. 3-1, headset 302 includes input transducer 202, output transducer 204, a first wireless transceiver 308-1 (of wireless transceiver system 208), a first processor 310-1 (of processor system 210) and SR on/off button 212. Wireless adapter 304 includes memory 206, a second wireless transceiver 308-1 (of wireless transceiver system 208) and a second processor 310-1 (of processor system 210). As noted earlier, memory 206 includes a programmable user SR profile. Communication between headset 302 and wireless adapter 304 takes place with the help of first wireless transceiver 308-1 and second wireless transceiver 308-2. First processor 310-1 controls operation of components 202, 204, 308-1 and 212 of headset 302 and second processor 310-2 controls operation of components 206 and 308-2 of wireless adapter 304.

Figure 32:
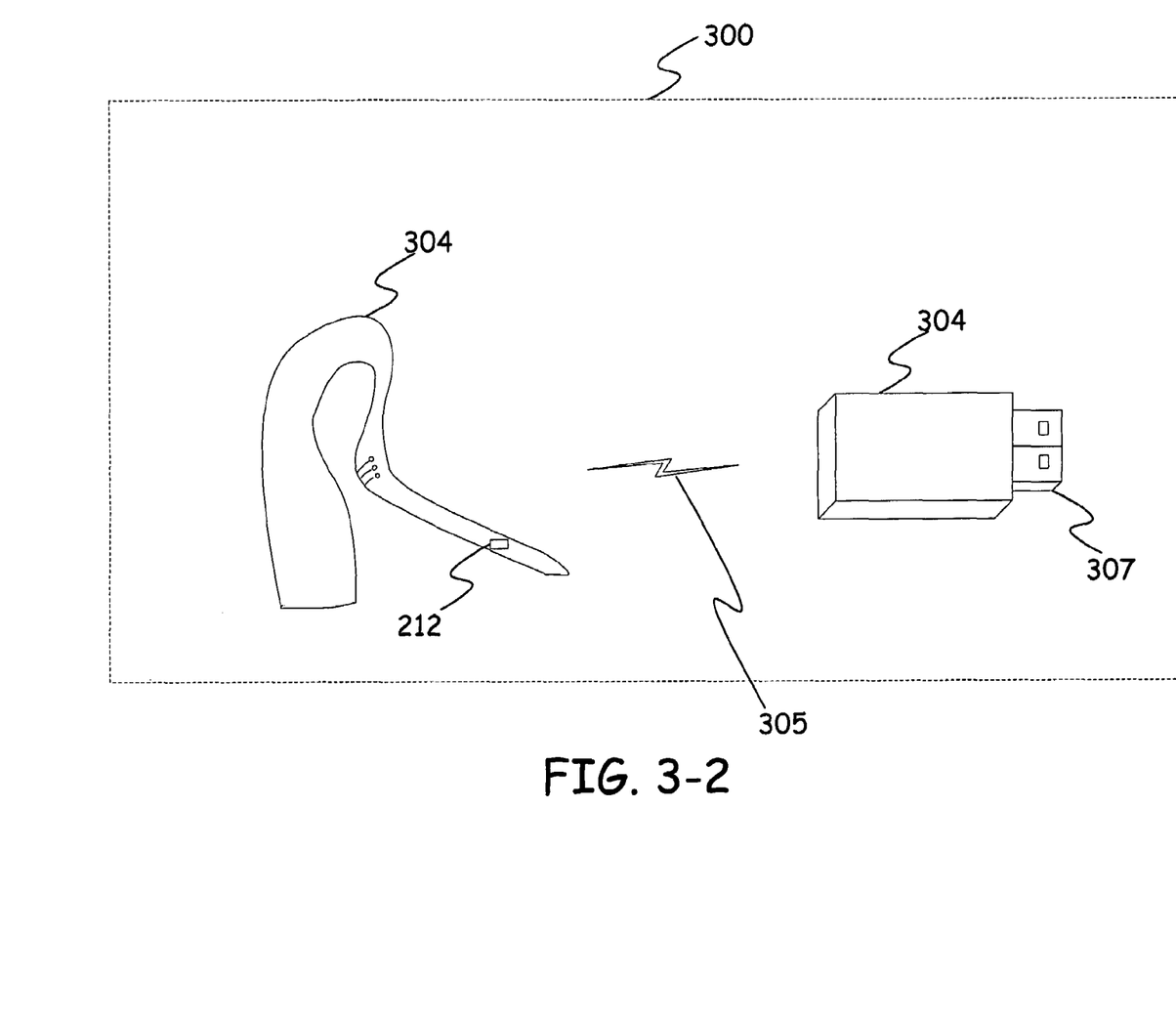

In general, system 300 enables a user to wirelessly interact via voice with any compatible SR-enabled PC (such as 306). System 300 includes a number of stored resources that provide for such interaction. In addition to the user SR profile, stored resources include drivers that provide an interface between a PC and system 300, secure user data and resources, "voice in/voice out" applications (VUI) that can provide, for example, real-time driving directions, meetings notifications, natural assistance and/or interactions with devices/appliances such as home entertainment centers, etc. Different methods of using headset 302 and wireless adapter 304 to provide a SR "portable user experience" are described below.

In one method of using system 300, a first time user can log in to a desktop PC, for example, and plug connector 307 of wireless adapter 304 into the PC's USB port (or any other suitable computer port/slot). If suitably configured, the PC automatically detects headset 302 and launches a SR configuration application for a first time user experience. The user can now configure SR settings and can proceed to take an interactive tutorial. A programmable user speech recognition profile that includes results from the interactive tutorial and the chosen SR settings is produced. A copy of the programmable SR profile is stored in memory 206. It should be noted that programmable user SR profile may be blank (or may include an initial speech profile which is tuned for a particular embodiment of headset 302 by any speaker) before first use of system 300. After the interactive tutorial, the user is ready to carry out relatively complex tasks, such as word processing, using SR.

For example, the user can enable SR by pressing SR on/off button 212, on headset 302, and then utter "Open Word Processing Software," for example. In response, a new document window is opened on the PC. The user can then begin dictating words, which get inserted into the document. The user can disable SR at any time by pressing SR on/off button 212 on headset 302. Of course, the user can re-enable SR by pressing the same button. The user can save a draft document in memory 206 and then remove adapter 304 from the computer port of the desktop PC. It should be noted that the programmable user SR profile adjusts to the manner in which the user pronounces words and therefore memory 206 can be updated with a current copy of the programmable user SR profile when the draft document is saved in memory 206, for example.

At a later time, the user can plug wireless adapter 304 into a computer port (for example, a USB port or any other suitable port currently known or developed in future) of a SR-enabled laptop PC, for example, and turn wireless headset 302 on. A SR user interface launches and confirms that SR is enabled. This is followed by a transfer of the programmable user SR profile to the laptop PC. The user can then press SR on/off button 212 on headset 302 and substantially immediately begin editing the draft document.

In another method of using system 300, a user can wear headset 302, turn it on, and communicate with a compatible cellular telephone and/or a compatible automobile computer.

For example, when using headset 302 with a "smart" cellular telephone, the user can press button 212 and say "Where's my next meeting?," for example. The cellular telephone can respond, through output transducer 204 of headset 302, "Your next meeting is at campus number 1, Building 17, office 3075," for example.

When the user's automobile is started, the cellular telephone and headset 302 can automatically establish a network connection with the automobile's central computer via a wireless hub (for example, a Bluetooth hub). The wireless hub can be built into wireless adapter 302. The user can be notified of a successful connection with the automobile's central computer via a recognizable herald, which the user can hear through output transducer 204 of headset 302.

To customize a driving experience, the user can say, for example, "Start listening. Set the temperature to 70 degrees and tune into WXYZ." In response, the automobile's temperature and radio settings can substantially immediately be adjusted. If the cellular telephone has traffic monitoring software, the user can begin interacting with it by saying, for example, "Start listening. How's traffic on route 520?" Traffic updates can then be provided to the user from the cellular telephone through output transducer 204 of headset 302.

If the user has to make a call to inform a superior of a delay caused by traffic, for example, the automobile radio's volume is muted as soon as the call goes through. Once the conversation is completed, the automobile radio's volume setting is automatically restored to its original state.

In general, system 300 provides with an un-tethered manner of interacting with several different compatible devices. Other embodiments of the portable wireless-enabled system that operate in a manner similar to system 300 are described below in connection with FIGS. 4-7.

Figure 4:
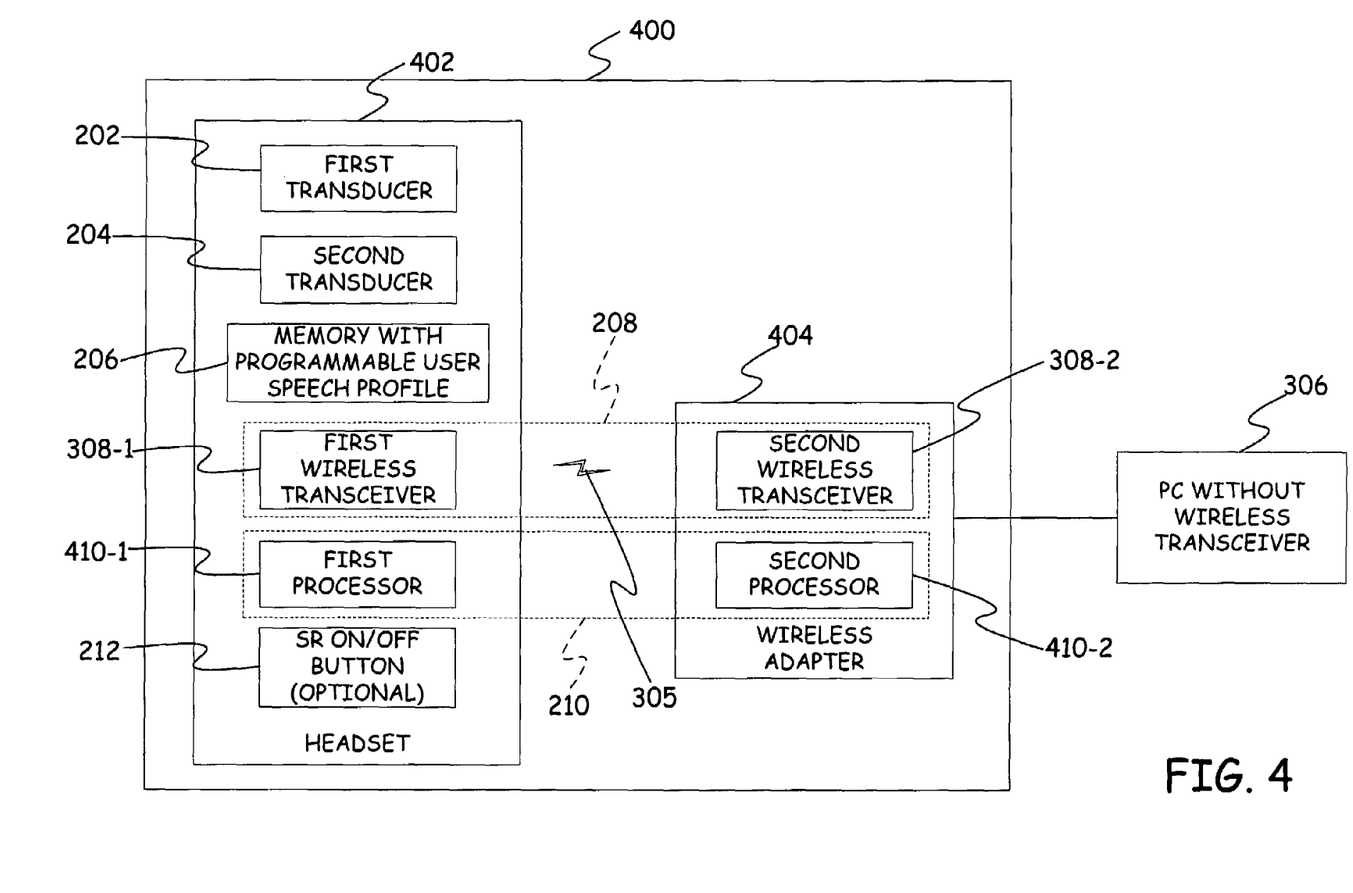

FIG. 4 shows a portable wireless-enabled system 400, which is similar to system 300 shown in FIGS. 3-1 and 3-2. However, unlike wireless headset 302 of FIG. 3, wireless headset 402 of system 400 (FIG. 4) has embedded memory capacity (includes memory 206, which includes a programmable user SR profile and can include other program code, user data, etc). Wireless adapter 404, which does not include memory 206, connects non-wirelessly to a PC 306 in a manner similar to wireless adapter 304 of FIGS. 3-1 and 3-2. In this embodiment, headset 402 can communicate speech signals to PC 306 via wireless adapter 404 and also provide the programmable user SR profile to PC 306 via wireless adapter 404. Of course, due to the difference in location of memory 206 between FIG. 3-1 and FIG. 4, processors 410-1 and 410-2 (FIG. 4) are configured differently form processors 310-1 and 310-2 (FIG. 3). In general, systems 300 and 400 operate in a similar manner and the differences between the systems are substantially transparent to a user.

Figure 5:
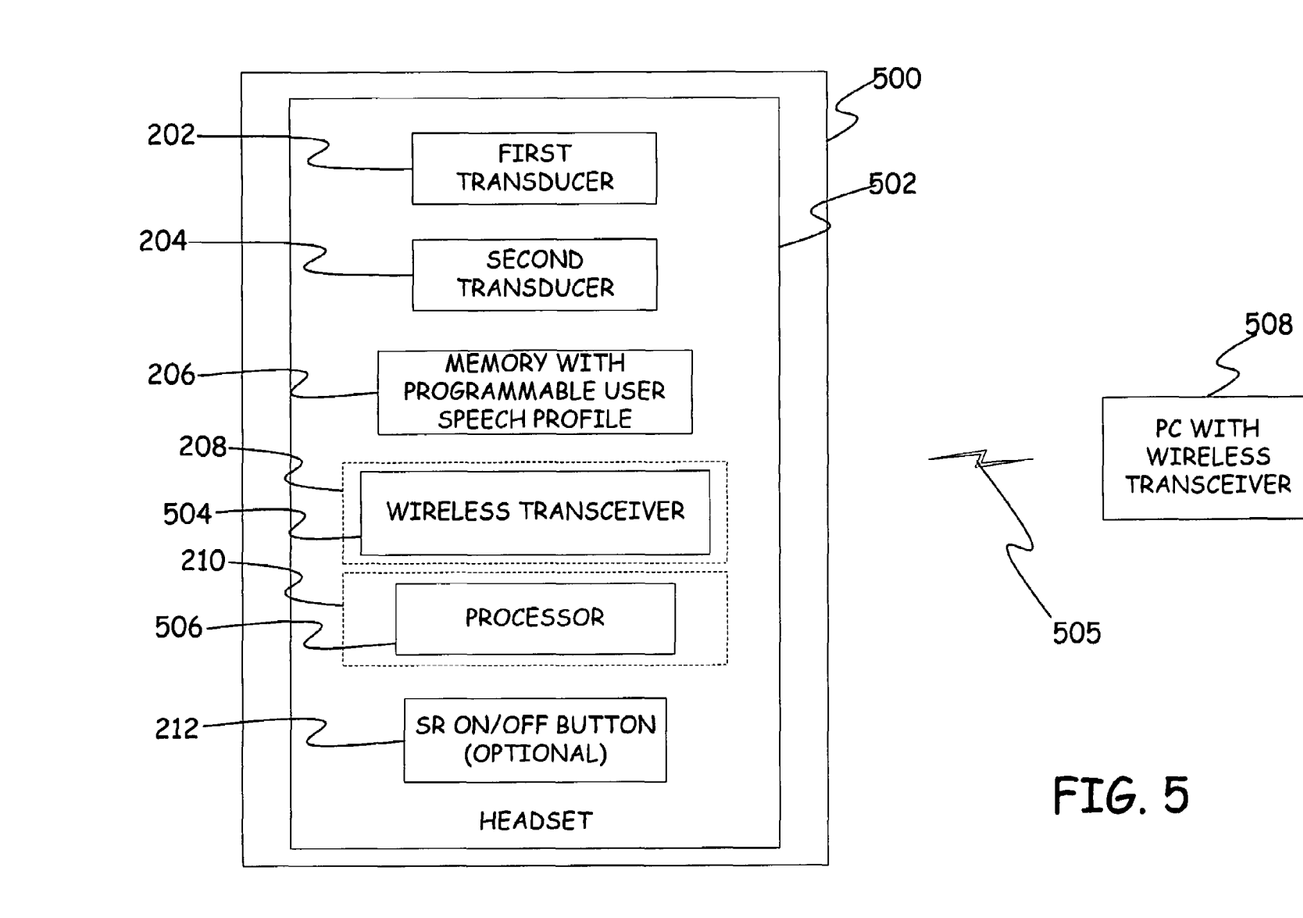
Figure 6:
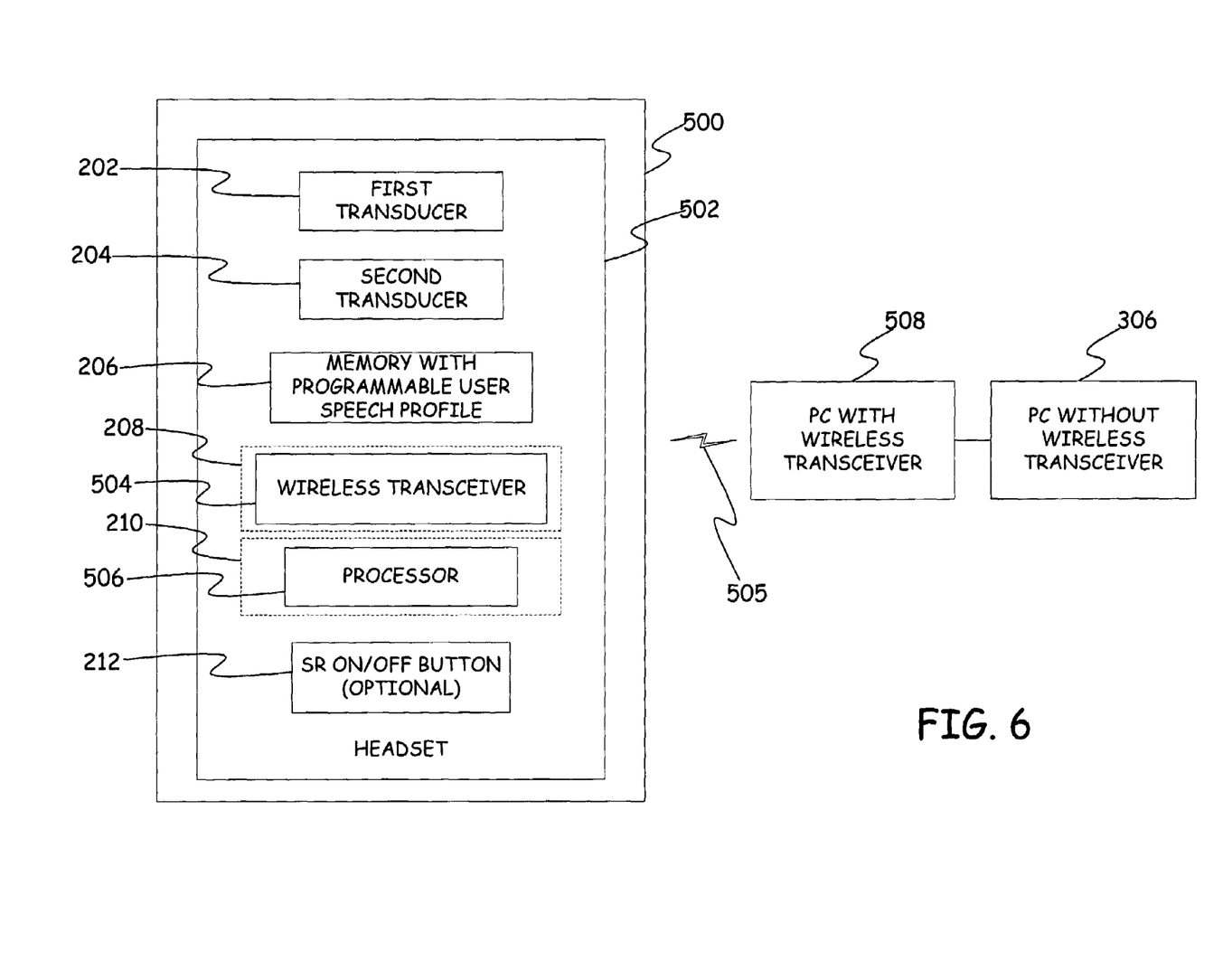

FIG. 5 shows a portable wireless-enabled system 500, which, in general, is similar to system 300 (FIGS. 3-1 and 3-2) and system 400 (FIG. 4). However, as can be seen in FIG. 5, system 500 is a one-piece unit, with the single piece being a headset 502. In system 500, wireless transceiver system 208 includes a single wireless transceiver 504 and processor system 210 includes a single processor 506. All components of system 500 are within headset 502. Headset 502 cannot be plugged in to a computer port of a PC, for example, and therefore can communicate only with a compatible wireless-enabled PC (such as 508). Other than being unsuitable for direct use with a non-wireless enabled PC, system 500, in general, operates in a manner similar to that of systems 300 and 400 that were described earlier. However, as shown in FIG. 6, system 500 can communicate with a non-wirelessly enabled PC 306 via a wireless-enabled PC 508. Here, wireless-enabled PC 508 provides communication in a manner similar to wireless adapter 404 (FIG. 4).

Figure 7:
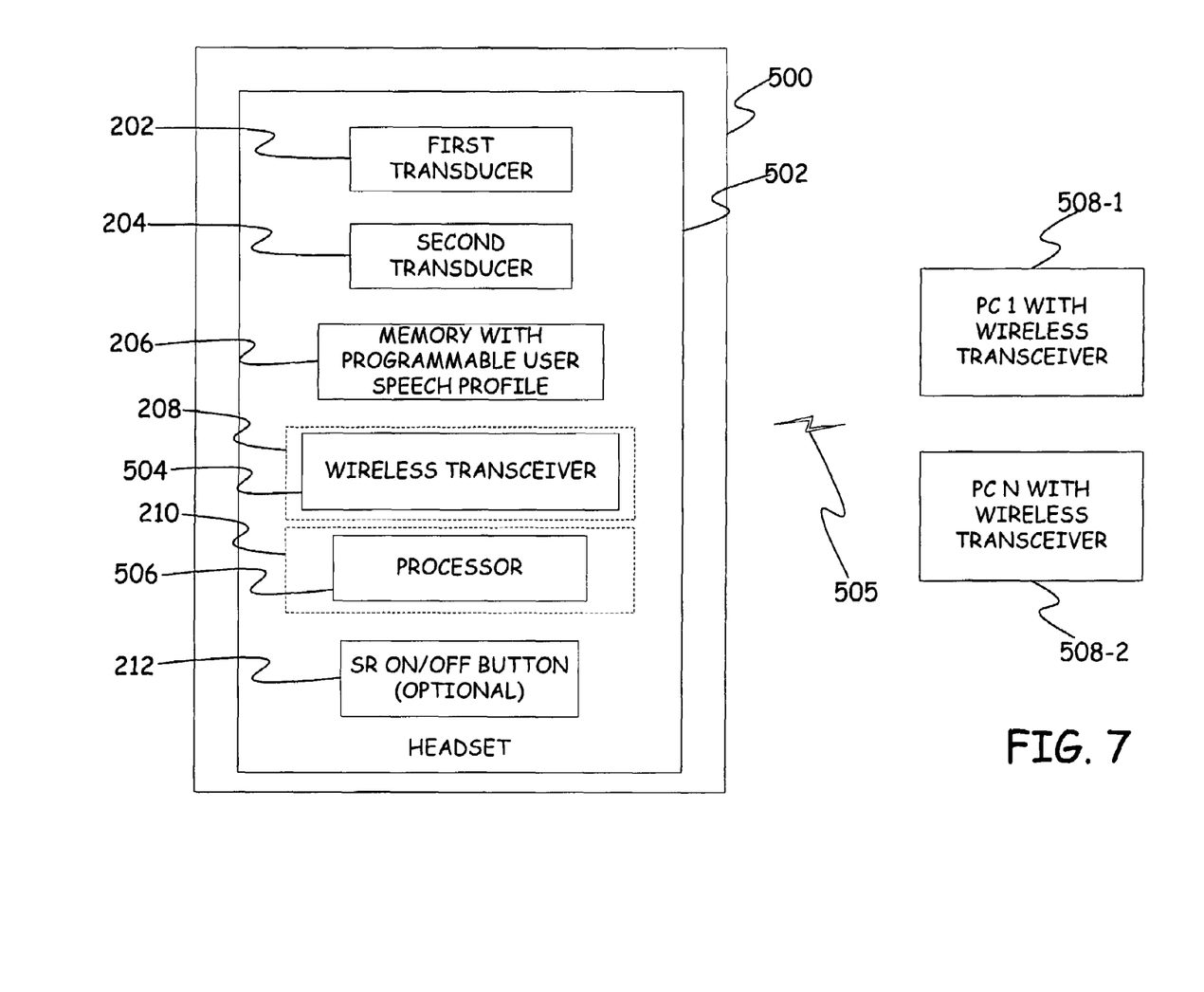

FIG. 7 shows an embodiment of system 500, which is configured to communicate with multiple wireless-enabled. PCs (PC 1 designated by reference numeral 508-1 and PC N designated by reference numeral 508-2). In essence, the embodiment of FIG. 7 is a wireless headset with embedded memory capacity connecting to multiple speech-enabled PCs that are wireless-enabled.

In general, the above-described portable wireless systems provide users with a hands-free method for interacting with compatible devices. The systems provide users with an un-tethered manner of interacting with SR applications. Further, as discussed above, the present embodiments provide users with an instantaneous and intuitive manner of launching, setting up, learning, using, synchronizing, and porting their SR user experience to any compatible device.

Figure 8:
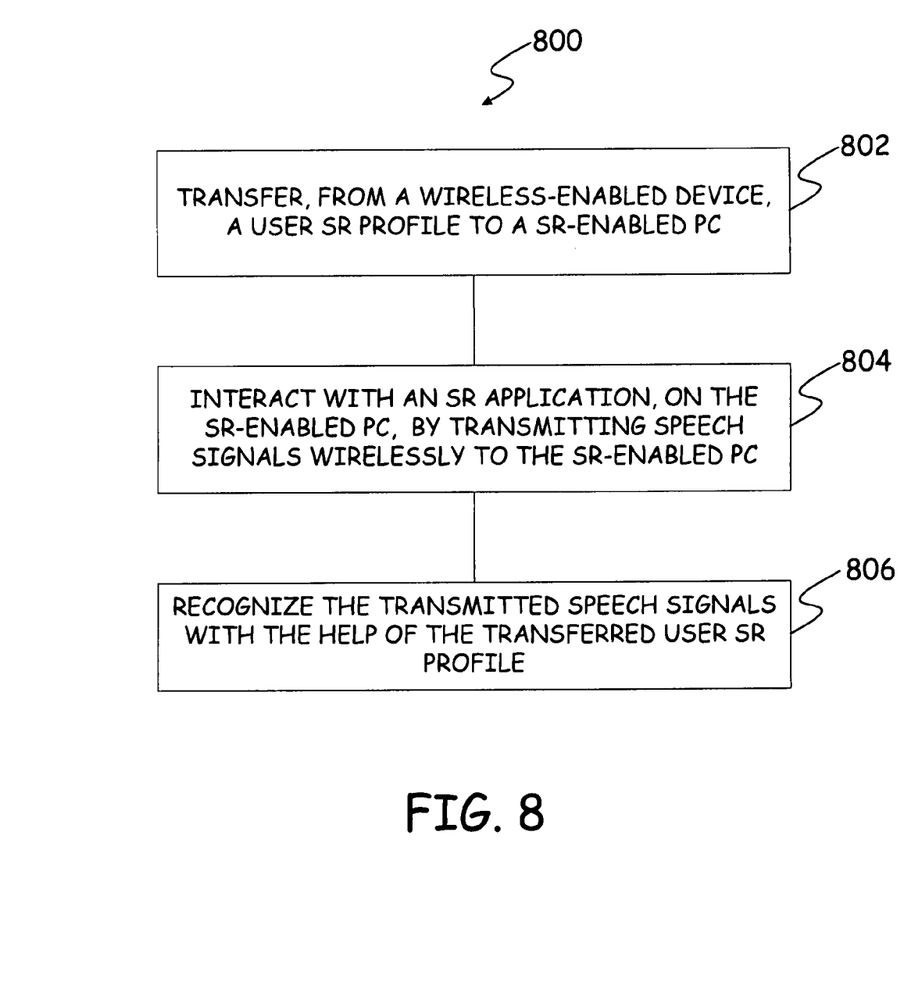
FIG. 8 is a flowchart that illustrates one of the present embodiments.

FIG. 8 is a flowchart 800 that illustrates one of the present method embodiments. The example embodiment shown in FIG. 8 relates to a method of interacting with a SR-enabled PC. At step 802, a user SR profile is transferred from a wireless-enabled device to the SR-enabled PC. At step 804, interaction with SR applications, on the SR-enabled PC, is carried out by transmitting speech signals wirelessly to the SR-enabled PC. At step 806, the transmitted speech signals are recognized with the help of the transferred user SR profile. In general, different techniques, some of which are set forth above, can be employed to carry out the steps shown in the flowchart of FIG. 8 while maintaining substantially the same functionality without departing from the scope and spirit of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Although the embodiments of FIGS. 5, 6 and 7 include wireless headsets with an embedded programmable user SR profile, the present embodiments, in general, also encompass any headset (wireless or non-wireless) with an embedded programmable user SR profile.

What is claimed is:

1. A method of interacting with a speech recognition (SR)-enabled personal computer (PC) using a portable wireless-enabled device, the method comprising: transferring, from the portable wireless-enabled device, a programmable user-trained SR profile to the SR-enabled PC; interacting with a SR application, on the SR-enabled PC, by transmitting speech signals wirelessly from the portable wireless-enabled device to the SR-enabled PC; and recognizing the transmitted speech signals on the SR-enabled PC with the help of the transferred programmable user-trained SR profile from the portable wireless-enabled device.

2. The method of claim 1 wherein the SR-enabled PC is wireless-enabled and wherein transmitting the speech signals wirelessly to the SR-enabled PC is a direct transfer of the speech signals to the PC via a wireless communication link.

3. The method of claim 2 wherein the wireless communication link is a Bluetooth wireless communication link.

4. The method of claim 1 wherein the SR-enabled PC is non-wireless-enabled and wherein transmitting the speech signals wirelessly to the SR-enabled PC is an indirect transfer of the speech signals to the PC via a wireless adapter that is coupled to the PC, and wherein the wireless adapter receives the speech signals via a wireless communication link.

5. The method of claim 4 wherein the wireless communication link is a Bluetooth wireless communication link.

6. The method of claim 1 wherein the wireless-enabled device, from which the programmable user-trained SR profile is transferred to the SR-enabled PC, is a wireless adapter coupled non-wirelessly to the PC.

7. The method of claim 1 wherein the wireless-enabled device, from which the programmable user-trained SR profile is transferred to the SR-enabled PC, is a headset.

8. The method of claim 7 wherein the SR-enabled PC is wireless-enabled and wherein the programmable user-trained SR profile is transferred wirelessly from the headset directly to the PC.

9. The method of claim 7 and wherein the SR-enabled PC is non-wireless-enabled and wherein the and wherein the programmable user-trained SR profile is transferred wirelessly to a wireless adapter, coupled non-wirelessly to the PC, which, in turn, transfers the programmable user-trained SR profile to the PC.

10. The method of claim 1 wherein transmitting speech signals wirelessly to the SR-enabled PC comprises transmitting speech signals wirelessly form a headset to the SR-enabled PC.

11. A method of configuring and utilizing a portable wireless-enabled system for interaction with a SR-enabled PC, the method comprising:
    storing a programmable user-trained SR profile in a memory of the portable wireless-enabled system; and
    configuring a processor of the portable wireless-enabled system to control a transfer of the programmable user-trained SR profile to the SR-enabled PC, wherein, upon transfer of the programmable user-trained SR profile to the SR-enabled PC, interaction between the portable wireless-enabled system and the SR-enabled PC is carried out by:

transmitting speech signals wirelessly from the portable wireless-enabled system to the SR-enabled PC; and recognizing the transmitted speech signals on the SR-enabled PC with the help of the transferred programmable user-trained SR profile from the portable wireless-enabled system.

12. The method of claim 11 wherein storing a programmable user-trained SR profile in a memory of the portable wireless-enabled system comprises storing the programmable user-trained SR profile in a memory within a wireless headset of the portable wireless-enabled system.

13. The method of claim 11 wherein storing a programmable user-trained SR profile in a memory of the portable wireless-enabled system comprises storing the programmable user-trained SR profile in a memory within a wireless adaptor of the portable wireless-enabled system.

14. A method a using a portable wireless-enabled system having a programmable user-trained SR profile, the method comprising:

transferring the programmable user-trained SR profile from the portable wireless-enabled system to a first SR-enabled PC for voice recognition on the first SR-enabled PC; building a draft document on the first SR-enabled PC by communicating via voice from a wireless headset of the portable wireless-enabled system;

saving the draft document in a memory of the portable wireless-enabled system;

transferrring the programmable user-trained SR profile, and the draft document from the memory, to a second SR-enabled PC, wherein the programmable user-trained SR profile is utilized for voice recognition on the second SR-enabled PC;

editing the draft document on the second SR-enabled PC by communicating via voice from the wireless headset.

15. The method of claim 14 wherein the programmable user-trained SR profile is stored in the headset of the portable wireless-enabled system.

16. The method of claim 14 wherein the programmable user-trained SR profile is stored in a wireless adapter of the portable wireless-enabled system.

17. The method of claim 14 wherein saving the draft document in a memory of the portable wireless-enabled system comprises saving the draft document in a memory of a wireless adapter of the portable wireless-enabled system.

18. The method of claim 17 and further comprising connecting the wireless adapter to the first SR-enabled PC before building the draft document.

19. The method of claim 18 and further comprising connecting the wireless adapter to the second SR-enabled PC before editing the draft document.

20. The method of claim 14 wherein the voice communication is carried out via a Bluetooth network.

* * * * *